Feb. 2, 1960   B. H. SINCLAIR ET AL   2,923,935
PROTECTIVE SYSTEM FOR RADIO BEACONS
Filed Nov. 15, 1956

Inventors
Bert H. Sinclair
Roland R. Gordon
by Robert S. Toperzer Atty.

2,923,935

PROTECTIVE SYSTEM FOR RADIO BEACONS

Bert H. Sinclair, Westwood, and Roland R. Gordon, Holliston, Mass., assignors to General Communication Co., Boston, Mass., a corporation of Massachusetts Application November 15, 1956, Serial No. 622,445

4 Claims. (Cl. 343—101)

This invention relates to transponding radio beacons, and in particular it relates to protective systems for automatically limiting the duty cycle of beacons of this type.

In essence, it is the function of a transponder beacon to receive relatively low level pulses of radio frequency energy from an interrogating transmitter, such as a radar transmitter, to amplify the interrogating pulses, and to broadcast relatively high power reply pulses in timed relation to the interrogating pulses. Due primarily to the fact that more than one transmitter may be interrogating the beacon simultaneously, the average rate at which interrogating pulses are received by the beacon, may be, and often is, substantially higher than the rate at which the beacon is capable of replying for any length of time without the average power rating of its modulator and transmitter being exceeded. It is the usual practice, therefore, to incorporate in the beacon some form of protective system for limiting the average repetition rate of the reply pulses to a predetermined value even though the rate at which pulses are being received may greatly exceed this value.

Conventional protective systems are usually designed either to render the beacon inoperative for a predetermined length of time after each transmitted reply pulse, or to effect a count-down of the interrogating pulses when their average repetition rate becomes excessive to the end that only a predetermined fraction of the pulses received are repeated in the form of transmitted reply pulses. The primary disadvantage of these systems lies in the fact that they make the beacon vulnerable to capture; that is, the beacon is oftentimes caused to respond only to one of a group of interrogating transmitters without replying to the other transmitters at all. Then too, such systems necessarily include gating or count-down circuits in series between the beacon receiver and transmitter, which adds materially to the time delay between the received interrogating pulses and the transmitted reply pulses, and which sometimes causes erratic operation of the beacon transmitter when the beacon is over-interrogated. If for any reason these protective circuits fail, the beacon is rendered inoperative, which, of course, is also disadvantageous.

It is an object of the present invention to provide an over-interrogation protective system for a transponder beacon which avoids the aforementioned disadvantages of conventional systems.

According to the present invention a form of over-interrogation protective system is provided, which momentarily prevents the beacon transmitter from responding to groups of received pulses when the interrogation rate becomes excessive, rather than introducing dead-time after each received pulse or suppressing alternate replies as is the case with conventional systems. In this way, the ability of the beacon to respond to several interrogating transmitters simultaneously without capture is not impaired, and also a rapid recovery of the beacon system is permitted after each transmitted reply pulse. Furthermore, the over-interrogation protective system of the present invention is adapted to be connected in adjunct to the beacon receiver and transmitter so that it does not introduce troublesome time delays or increase the likelihood of the beacon failing to operate. If the protective system fails for any reason, the beacon remains in operation.

In brief, there is provided in the system of the present invention an integrating network especially adapted to operate on pulses corresponding in width and repetition rate to the reply pulses supplied from the beacon modulator or driver, and to provide a direct voltage whose amplitude is an integral function of these pulses. Coupled to the output terminals of the integrating network is a monostable or "one shot" multivibrator which is triggered into action when the direct voltage reaches a predetermined threshold value and which in turn furnishes a negative pulse for gating off the beacon amplifier or some element associated therewith, thereby to render the beacon transmitter inoperative so long as the gating pulse endures. This gating action is repetitive during periods of over-interrogation so that the overall effect is to limit the duty cycle of the beacon as required to maintain its average power output within permissible limits. The limiting action is especially smooth since, in effect, only a small number of reply pulses are suppressed as the rate of interrogation approaches the predetermined limit, the number increasing gradually so long as an excessive interrogation rate persists until only that number of reply pulses per second is transmitted consistent with the power capabilities of the beacon. Since the protective system is sensitive not only to the average repetition rate of the reply pulses but also to their duration, it follows that even when the beacon is called upon to provide reply pulses of increased width, as is normal for many type beacons, the system remains effective because it is truly duty cycle sensitive.

The novel features of the invention, together with further objects and advantages thereof will become more readily apparent from the following detailed description of a preferred embodiment of the invention shown in the accompanying drawing. In the drawing.

Figure 1:
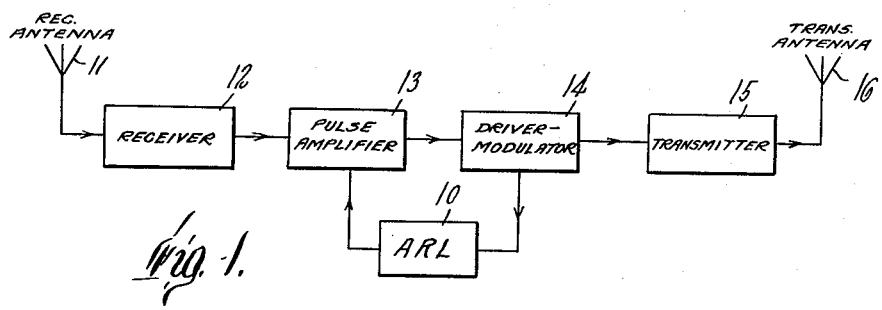
Fig. 1 is a block diagram of a transponder beacon incorporating the over-interrogation protective system of the present invention.

With reference now to Fig. 1 of the drawing, where a conventional transponder beacon incorporating the over-interrogation protective system of the present invention has been illustrated in block form, it will be observed that the block 10 representing the protective system bears the designation ARL. This stands for automatic reply limiter, the designation which is applied to such systems generally and which will be applied hereinafter to the system of the present invention. It will also be observed by those skilled in the art that the beacon itself, as shown in Fig. 1, has been greatly simplified since the particular elements employed therein form no part of the present invention and olny the briefest outline thereof will suffice to explain the ARL system. Thus, a receiving antenna 11 for the interrogating pulses is coupled to a receiver 12 which in turn is coupled to an amplifier 13 for amplifying the interrogating pulses detected by the receiver. A modulator and driver therefor 14, triggered by pulses from the amplifier 13 serve to fire a transmitter 15 in synchronism with the interrogating pulses. Consequently, under conditions when the average rate of interrogation is low, a reply pulse is sent out via a transmitting antenna 16 in response to each interrogating pulse that is received by the receiver 12.

In the event that the average interrogating rate becomes excessive, or for any other reason the duty cycle of the beacon approaches the limit determined by its maximum average power output rating, it is the function of the ARL system to sense this condition and to limit the duty cycle accordingly. To this end, pulses derived from the driver-modulator 14 are sampled by the ARL system, and when the product of the average repetition rate and width of these pulses exceeds a predetermined value, there is produced by the ARL, in a manner to be described in detail hereinafter, a negative gating pulse whose duration is fixed in accordance with the duty cycle limitations of the beacon and the maximum interrogation rates to be expected. This gating pulse is impressed on the input circuit of the amplifier 13 to render it insensitive momentarily, so that the driver-modulator, and hence all elements of the beacon following it, including the transmitter, are effectively gated off. So long as an excessive interrogation rate persists, the gating pulse will recur periodically, thereby arresting the normal reply function of the beacon at intervals calculated to maintain the duty cycle of the beacon within its rating.

Figure 2:
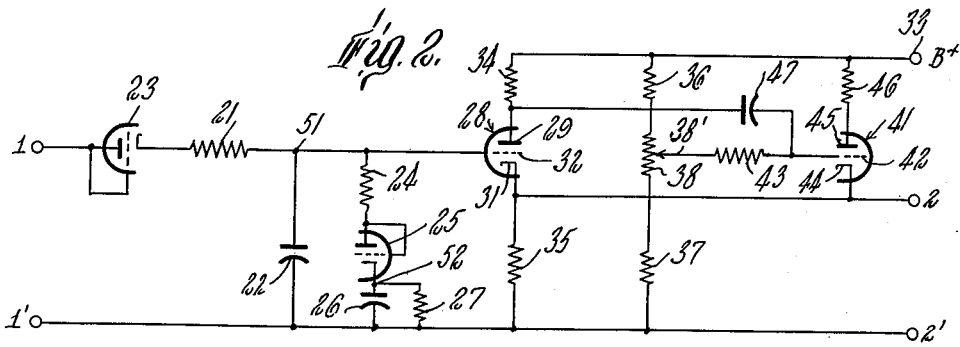
Fig. 2 is a schematic diagram of the system illustrated in block form in Fig. 1.

With reference now to Fig. 2, where the ARL system of the present invention is illustrated in more detail, schematically, it will be observed that the input to the system for sampling pulses from the driver-modulator 14, is characterized by a pair of input terminals 1—1', and the output of the system for supplying gating pulses to the amplifier 13 is characterized by a pair of output terminals 2—2'. Connected across the input terminals 1—1' is a first integrating network comprising a resistor 21 and a capacitor 22 in series combination with a triode electron discharge device operated as a diode rectifier 23. The output of this first integrating network, defined by the terminals of the capacitor 22, is connected to a second integrating network including a resistor 24, a rectifier 25 like rectifier 23, and a capacitor 26, also in series with one another. As shown, a discharge path for capacitor 26 is provided by the connection of a resistor 27 across the capacitor 26.

In addition to the second integrating network, there is connected to the output of the first integrating network a monostable or "one shot" multivibrator whose input circuit comprises the control circuit of a first triode electron discharge device 28 having an anode 29, a cathode 31 and a control electrode 32. Anode 29 is connected to a source of anode potential 33 through an anode resistor 34, and cathode 31 is connected to the common input terminal 1' through a cathode biasing resistor 35. Coupled between the anode potential source 33 and the common terminal 1' is a voltage dividing circuit formed with fixed resistors 36 and 37, and an adjustable resistor 38 whose movable arm 38' serves to provide a biasing potential for a second triode electron discharge device 41. More specifically, movable arm 38' is connected to the control electrode 42 of triode 41 through a grid resistor 43, and the cathode 44 of triode 41 is tied to the same point as is the cathode 31 of triode 28. Anode potential for the anode 45 of triode 41 is supplied from source 33 just as in the case of triode 28, but it is significant that an anode resistor 46 is employed in the anode circuit of triode 41 which has a substantially lower value than the anode resistor 34 associated with triode 28. Finally, a coupling capacitor 47 is provided between the anode of triode 28 and the control electrode of triode 41, the output of the multivibrator comprising the common cathode circuit formed with resistor 35 to which the output terminals 2—2' are connected.

In operation, pulses derived from the driver-modulator 14 of the beacon are applied to the capacitor 22 of the first integrator through the diode 23 and the resistor 21. Capacitor 22 is charged by the individual pulses but during the interpulse period it discharges through resistor 24 and diode 25 into the capacitor 26 associated with the second integrator. The charge accumulated on capacitor 26, in turn, is permitted to leak off slowly through the resistor 27 so that when the interpulse period is sufficiently short, voltage builds up on the capacitors 22 and 26 until the multivibrator triggers. That is to say, triode 28 is normally cut off while triode 41 is conducting. When the voltage on capacitor 22 reaches a predetermined thresholding value, however, the cathode bias on triode 28 produced by the flow of anode current in triode 41 is overcome, and triode 28 begins to conduct. As a result, the anode potential of triode 28 is lowered which momentarily decreases the grid potential and so also the anode current of triode 41. Since the cathode bias on triode 28 from triode 41 is simultaneously decreased, it is apparent that the transfer of anode current between the triodes sustains itself until triode 28 becomes strongly conductive and triode 41 becomes cut off. Under these conditions, the voltage across terminals 2—2' will be less than was the case with triode 41 conducting because of the fact that anode resistor 34 has a substantially higher value than anode resistor 46, and hence the flow of anode current through cathode resistor 35 is more limited. As soon as capacitor 47 discharges to the extent that the potential of the control electrode of triode 41 becomes substantially equal to that of the movable arm 38', however, the reverse operation takes place and the multivibrator returns to its stable state with triode 41 conductive and triode 28 cut off. In the meantime, the integrator capacitors 22 and 26 will have been discharged substantially, the former through the grid circuit of triode 28, and the latter through resistor 27, so that the multivibrator remains in its stable state until a sufficient voltage again builds up on capacitor 22, to trigger the multivibrator, as indeed it will so long as an excessive interrogation rate persists. The net result, therefore, is that each time the multivibrator is triggered, a negative pulse is supplied via the output terminals 2—2' to the beacon amplifier in such a way as to desensitize the amplifier, and hence gate off all succeeding elements of the beacon for the duration of the pulse. The precise width of the gating pulse employed may be controlled by proper choice of the multivibrator circuit constants, especially resistor 43 and capacitor 47. This will be apparent to those skilled in the art as will be the mode of connection to the amplifier 13 required to effectively desensitize it when the gating pulse is applied thereto.

Figure 3:
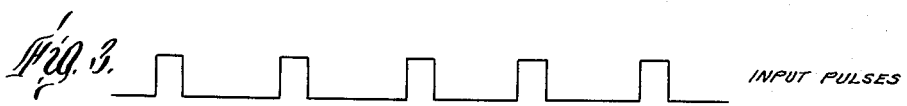
Figs. 3 and 4 are graphs illustrating the waveforms of the voltages at certain points in the system as a function of time.
Figure 4:
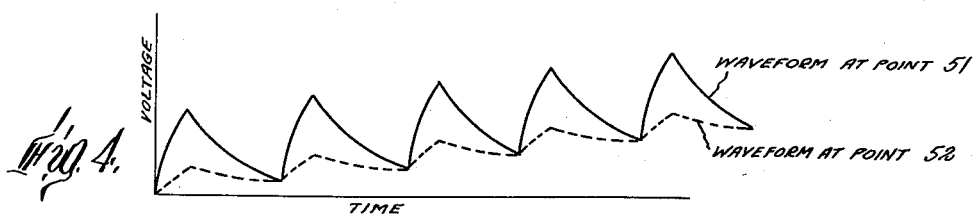

The special manner in which the integrator portion of the system operates will be understood more clearly with reference to Figs. 3 and 4 where the input pulses applied to the terminals 1—1' and the waveforms at points 51 and 52 are illustrated. As shown in Fig. 4, so long as an input pulse endures both capacitors 22 and 26 accumulate charge, the latter at a considerably slower rate than the former, because resistor 24 is much larger than resistor 21 and hence the second integrating network has a considerably slower rise time characteristic. Similarly, during an interpulse period both capacitors 22 and 26 discharge but the rate at which capacitor 26 loses its charge is much the slower because resistor 24 is small compared to resistor 27, and hence as fast as capacitor 26 discharges through resistor 27, additional charge is supplied thereto from capacitor 22. In fact, even when the average repetition rate of the pulse is high, as shown, capacitor 22 discharges during an interpulse period to the extent that its voltage becomes substantially the same as the voltage remaining on the capacitor 26. But since the voltage across capacitor 22 rises to a much higher value than that across capacitor 26 while an input pulse is occurring, the precise instant at which the multivibrator triggers is determined primarily by the maximum instantaneous voltage attained by capacitor 22. In effect, therefore, when the interrogation rate is high, the second integrating network provides a slowly rising base point voltage for the relatively sharp output pulses provided by the first integrating network and in this way, the multivibrator is caused to trigger on the last discrete pulse of a group of pulses whose number corresponds very closely to the number selected for any given repetition rate and pulse width.

By way of example, illustrative values for the circuit constants of the ARL system according to the invention are given below:

| | | |
|---|---|---|
| Resistor 21 | ohms | 3,300 |
| Resistor 24 | do | 200,000 |
| Resistor 27 | megohms | 2.7 |
| Resistor 34 | ohms | 180,000 |
| Resistor 35 | do | 3,300 |
| Resistor 36 | do | 120,000 |
| Resistor 37 | do | 22,000 |
| Resistor 38 | do | 10,000 |
| Resistor 43 | megohm | 1 |
| Resistor 46 | ohms | 4,700 |
| Capacitor 22 | micromicrofarads | 390 |
| Capacitor 26 | do | 220 |
| Capacitor 47 | do | 470 |
| Rectifiers 23 and 25 | | 6021 |
| Triodes 28 and 41 | | 6021 |

With input pulses approximately 0.5 microsecond wide, these values were found to be optimum for limiting the average reply rate of the beacon to approximately 4,000 pulses per second even though the beacon is subject to interrogation rates as high as 10,000 pulses per second. As will be apparent to those skilled in the art, however, different circuit constants will be required to achieve optimum reply limiting for beacons having different duty cycle ratings and operating under different conditions. These may be calculated in accordance with well known principles based on the particular design requirements involved. Similarly, other types of trigger circuits than the monostable multivibrator illustrated may be adapted to function equally well in the ARL system of the invention.

Various such modifications of the preferred embodiment illustrated that lie within the spirit and scope of the invention will no doubt occur to those skilled in the art, and therefore, what is claimed is:

1. In a transponder radio beacon having a receiver to detect interrogating pulses and a transmitter to broadcast reply pulses in timed relation to the interrogating pulses, the combination including means to derive sample pulses representative of the reply pulses in width and repetition rate, a first integrating network having a relatively fast rise time characteristic, said first network having an input circuit to which said sample pulses are applied and an output circuit, a second integrating network having a relatively slower rise time characteristic, said second network having an input circuit coupled to the output circuit of said first network and an output circuit, means coupled to the output circuit of said second network to discharge the same at a relatively slow rate, and means responsive to a predetermined threshold value of voltage developed in the output circuit of said first network to render the beacon transmitter inoperative momentarily as required to maintain the duty cycle of the beacon within its rating.

2. In a transponder radio beacon having a receiver to detect interrogating pulses and a transmitter to broadcast reply pulses in timed relation to the interrogating pulses, the combination including means to derive sample pulses representative of the reply pulses in width and repetition rate, a first integrating network having a relatively fast rise time characteristic, said first network having an input circuit to which said sample pulses are applied and an output circuit, a second integrating network having a relatively slower rise time characteristic, said second network having an input circuit coupled to the output circuit of said first network and an output circuit, means coupled to the output circuit of said second network to discharge the same at a relatively slow rate, and a monostable multivibrator coupled to the output circuit of said first network to provide a gating pulse in response to a predetermined threshold value of the voltage developed in the output circuit of said first network for rendering the beacon transmitter inoperative momentarily as required to maintain the duty cycle of the beacon within its rating.

3. In a transponder radio beacon having a receiver to detect interrrogating pulses and a transmitter to broadcast reply pulses in timed relation to the interrogating pulses, the combination including means to provide at a pair of terminals sample pulses representative of the reply pulses in width and repetition rate, a first integrating network including a rectifier element, a resistive element and a capacitive element connected in series with one another across said terminals, said first integrating network having a relatively fast rise time characteristic, a second integrating network including a resistive element, a rectifier element and a capacitive element connected in series with one another across the capacitive element of said first integrating network, said second integrating network having a relatively slow rise time characteristic and further including a second resistive element connected across the capacitive element to discharge the latter at a relatively slow rate, and means responsive to a predetermined threshold value of the voltage developed across the capacitive element of said first integrating network for rendering the beacon transmitter inoperative momentarily as required to maintain the duty cycle of the beacon within its rating.

4. In a transponder radio beacon having a receiver to detect interrogating pulses and a transmitter to broadcast reply pulses in timed relation to the interrogating pulses, the combination including means to provide at a pair of terminals sample pulses representative of the interrogating pulses in width and repetition rate, a first integrating network including a rectifier element, a resistive element and a capacitive element connected in series with one another across said terminals, said first integrating network having a relatively fast rise time characteristic, a second integrating network including a resistive element, a rectifier element and a capacitive element connected in series with one another across the capacitive element of said first integrating network, said second integrating network having a relatively slow rise time characteristic and further including a second resistive element connected across the capacitive element to discharge the latter at a relatively slow rate, and a monostable multivibrator having a pair of input terminals coupled to the capacitive element of said first integrating network and a pair of output terminals, said multivibrator being triggered into action in response to a predetermined threshold value of the voltage developed across the capacitive element of said first integrating network and being adapted to provide at its output terminals a gating pulse for rendering the beacon transmitter inoperative momentarily as required to maintain the duty cycle of the beacon within its rating.

References Cited in the file of this patent

UNITED STATES PATENTS

| 2,427,191 | Brink | Sept. 9, 1947 |
| 2,460,202 | Tyson | Jan. 25, 1949 |
| 2,489,824 | Shenk | Nov. 29, 1949 |
| 2,530,096 | Sudman | Nov. 14, 1950 |
| 2,573,150 | Lacy | Oct. 30, 1951 |

FOREIGN PATENTS

| 653,846 | Great Britain | May 30, 1951 |